July 8, 1958  E. A. EASTON ET AL  2,842,429
CONCENTRATOR
Filed Oct. 11, 1956

INVENTORS.
EDWARD A. EASTON
STANLEY MAGAGNOSC
BY
Christie, Parker & Hale
ATTORNEYS

United States Patent Office

2,842,429
Patented July 8, 1958

2,842,429
CONCENTRATOR

Edward A. Easton, West Covina, and Stanley Magagnosc, Puente, Calif.

Application October 11, 1956, Serial No. 615,308

4 Claims. (Cl. 23—267)

This invention relates to a device for use in obtaining a concentration of dissolved material. It is particularly useful and was designed for introducing a concentration of dissolved fluoride into home water supplies.

Minute amounts of fluoride in the human diet have the effect of reducing the incidence of tooth decay. Studies conducted by public health services have overwhelmingly indicated the benefit to the teeth of fluoride in the diet.

The most satisfactory way of supplying the necessary dietary fluorides was found to be the use of drinking water containing the proper amount of dissolved fluoride. Optimum fluoride concentration of approximately one part per million parts of water was determined. In large doses fluorides are poisonous.

Where fluoride in sufficient quantity does not occur naturally in the water supply, it is necessary to add the proper amount in order to benefit.

The device described herein is for the purpose of adding fluoride to drinking water to reduce dental caries among the users. It is designed as a non-rechargeable cartridge to be discarded and replaced when it is exhausted.

Briefly described, the cartridge comprises a casing in which is disposed a member having a smaller cross-section than the casing. An annulus is thus provided between the casing and the inside member. The material to be dissolved, such as the fluoride crystals, is placed in the annulus. Means are provided for flowing a desired portion of the inlet fluid through the annulus to dissolve a portion of the material. The remaining portion of the inlet fluid flows through a bore provided in the inside member. Means are provided at the fluid outlet for combining the fluid containing the dissolved material with the other portion of the inlet fluid.

An optimum average fluoride concentration of one part per million has been recommended by authorities on dental health. With water having negligible initial fluoride and magnesium or calcium ion, the fluoride content of the effluent will approximate 0.8 part per million. With water having an initial fluoride concentration of 0.7 part per million, the fluoride content of the effluent will not exceed 1.4 parts per million. The device is not recommended for use with water having an initial fluoride concentration exceeding 0.7 part per million.

The device is designed as a tamper-proof disposable cartridge. When used as recommended, the maximum fluoride ion concentration of the effluent is less than one-fifth of the known safe maximum concentration.

A better understanding of the invention and its advantages may be had upon a reading of the following detailed description when taken in conjunction with the drawings, in which.

Figure 1:
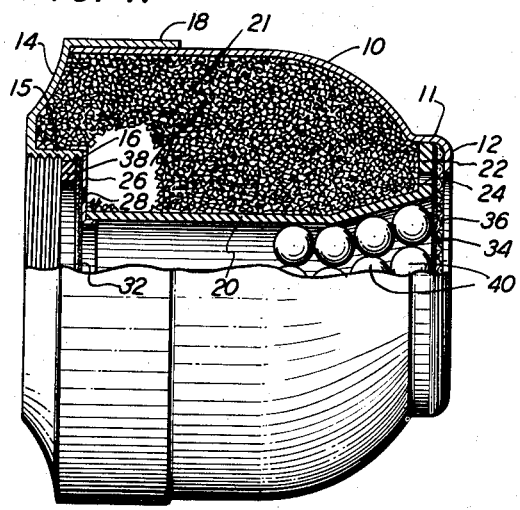
Fig. 1 is a side view, partially in section, showing our new device.
Figure 2:
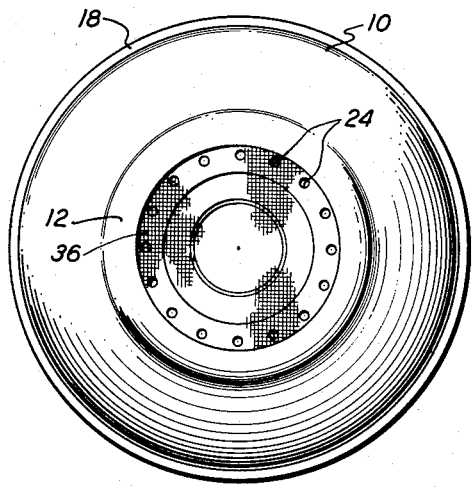
Fig. 2 is an end view of the fluid outlet of the device shown in Fig. 1.
Figure 3:
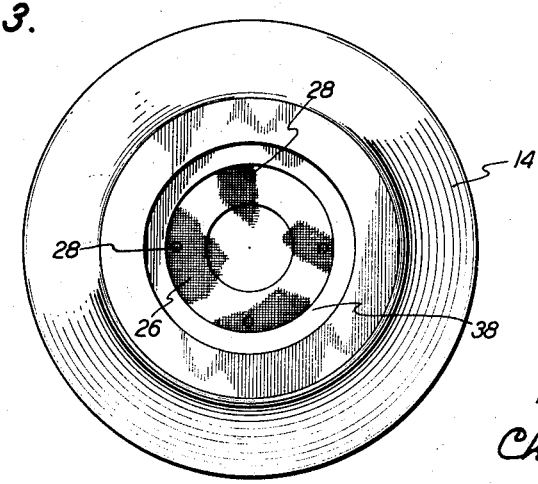
Fig. 3 is an end view of the fluid inlet of the device shown in Fig. 1.

Referring more particularly to Figs. 1, 2 and 3, the device includes a cup-bottom 10 which may be of chromium plated brass stamping. A shallow extension 11 of smaller diameter, having a turned-in portion 12, is provided at the fluid outlet of the cup 10.

A top-cover 14 of chromium plated brass stamping is formed to fit over the top portion of the cup 10, cover 14 and cup 10 thus forming an outside casing. An inwardly facing hub 15 is provided in cover 14, the hub being threaded at 16 to fit the threads found on many sink and lavatory faucets. The unit is secured to the faucet by means of these threads. The outside skirt section 18 of the cover 14 fits snugly around the top of cup 10 and overlaps the cup by the entire skirt length. The bottom edge of the skirt 18 and the cup wall adjacent to it are swaged slightly smaller during final assembly to complete the sealing of the device.

Located within the casing formed by members 10 and 14 is a hollow core member 20 having the lower end flanged as shown at 22. The bore of core 20 forms the through passageway for that part of the water flow which does not pass through the fluoride bed. The bore of core 20 is of smaller cross-section than the diameter of the casing formed by cup 10 and cover 14. Hence, an annulus 21 is provided between the casing and the core 20. The flange 22 at the lower end is perforated with a plurality of holes 24 to provide an outlet for the water through the fluoride bed.

A centering plate 26 is provided adjacent the fluid inlet. The centering plate 26 is a brass disk having a large hole in the center thereof and a plurality of smaller holes 28 equally spaced around the center. The outside periphery of plate 26 is flanged to fit over the hub portion 15 of the cover 14. The periphery of the large hole is flanged to fit inside the core member 20.

Provided at the fluid inlet is a screen member 32 of approximately 100 mesh. A 100-mesh screen 34 is also provided adjacent the fluid outlet.

A screen 36 of coarser mesh, say 30 mesh, is positioned between the fine mesh screen 34 and the turned-in portion 12 of the cup 10. Screens 32 and 34 prevent the escape of the granular material. Screen 36 protects screen 34 against damage.

A gasket 38 is placed inside the hub member 30 and against the screen member 32 to provide a water-tight seal between the device and the faucet to which it is attached.

Provided within the bore of core 20 are a plurality of glass spheres 40. Each of these spheres are about four millimeters in diameter. They serve to regulate the water flow division so that the proper proportion passes through the granular material in spite of variations in rate of flow of the fluid. Better control under varying flow conditions is thus provided as the fluoride bed becomes depleted than could be obtained with a simple orifice. As water flows through the bore of member 20, turbulent flow conditions occur which are similar to the conditions in the fluoride bed. Hence, the resistance of the spheres 40 to fluid flow varies in accordance with the variation in resistance of the granular material to provide a substantially constant concentration of dissolved fluoride regardless of changes in fluid flow.

The annulus is initially filled with a mixture of magnesium fluoride and calcium fluoride fused together at high temperature, then cooled and crushed to granules ranging in size from 30 mesh to 8 mesh. Its function is to provide, upon dissolution, the fluoride ion for addition to the water. The 30-mesh to 8-mesh granulation provides a high surface contact with the water flowing through it with adequate freedom of flow. Sixty to sixty-five grams of the material are contained within the device in the annular space between the inside walls of the cup 10 and the outside wall of core 20.

Figure 4:
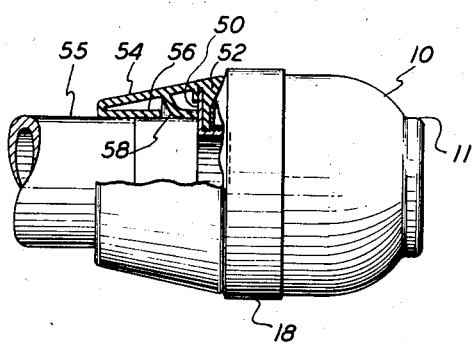
Fig. 4 shows a modification for use with water faucets which are not threaded.

Fig. 4 shows the device slightly modified for use with water faucets which are not threaded. An attachment ring 50 having a threaded portion is threaded onto the threads contained in the hub 15 (see Fig. 1). The attachment ring fits into a flange portion 52 of a rubber adapter 54. The device is attached to the faucet spout 55 by placing the rubber adapter 54 about the spout. A resilient portion 56 of the rubber adapter 54 is forced inwardly when the adapter is inserted over the spout 55. The spout 55 rests upon the attachment ring 50 in the adapter 54 and the device is held firmly upon the spout 55, by resilient portions 56 and 58.

The operation of this device is based on the dissolution of a fluoride compound to a limited concentration and adding this concentrate to the water flow in the proper proportion to result in the desired final fluoride concentration. To accomplish this, part of the flow is passed through the annulus containing the granular compound and the remainder passes through the bore in core 20 where it does not contact the granular compound. The two streams reunite at the outlet of the device. The flow proportions are established by the relative resistance to flow of the granular fluoride bed and the glass balls 40 in the bore of member 20. The fluoride concentration in the water discharged from the device is effectively limited by the fluoride compound used. An effective compound is a mixture of magnesium fluoride granules and calcium fluoride granules containing from 25% to 90% by weight of magnesium fluoride.

The correlation between the flow resistance of the fluoride bed and the flow resistance of the balls 40 determines the ratio of the two flows. These values, using 20 balls of approximately 4 millimeters diameter at several total flow rates, and with the granular fluoride bed partially depleted, are as follows:

| Total flow rate, G. P. M. | Condition of fluoride bed | Flows, G. P. M. | |
|---|---|---|---|
| | | Bypass through core | Fluoride bed |
| 1 | Full | 0.8 | 0.2 |
| 2 | Full | 1.6 | 0.4 |
| 4 | Full | 3.2 | 0.8 |
| 2 | ⅔ of original | 1.45 | 0.55 |
| 2 | ⅓ of original | 1.33 | 0.67 |

It should be noted that the proportion of water passing through the fluoride bed increases as the bed depth decreases. This is due to the reduction in the flow resistance of the fluoride bed, while the flow resistance through the core remains constant. This compensates to a certain extent for the reduction in contact area of a partially depleted bed by increasing the flow through the bed.

That portion of the water flowing through the fluoride bed when full, dissolves fluoride to the extent of approximately four parts per million for rejoining the bypass stream when the annular portion of the device is completely full. Since one-fifth of the inlet stream flows through the fluoride bed, the concentration of dissolved fluoride is 0.8 part per million, which is a safe concentration.

No appreciable increase in the fluoride output of the device was noted when it was tested with water at 150° F.

We claim:

1. In a device for obtaining a concentration of dissolved material and having a fluid inlet and a fluid outlet, an outside member and an inside member of smaller cross-section to provide an annulus into which the material to be dissolved is placed, means for flowing a portion of the inlet fluid through the annulus to dissolve a portion of the material and the other portion of the inlet fluid through the inside member, means at the fluid outlet for combining the fluid containing the dissolved material with the other portion of the inlet fluid, and at least one fluid flow responsive member within the inside member responsive to a changing fluid flow to vary the resistance to fluid flow in accordance with the varied resistance to fluid flow of the material so that a fixed concentration is maintained despite varied fluid flow.

2. A device in accordance with claim 1 wherein the means for flowing a portion of the inlet fluid through the annulus is a plate member having holes formed therein.

3. A fluoridizer including a casing having a fluid inlet and a fluid outlet, a core member within the casing and having a smaller cross-section than the casing, thus providing a space between them, the core member having a bore therethrough, a plate member connected across the fluid inlet and having a large hole across the open end of the core member and at least one smaller hole leading into the space, a granular fluoridizing mixture within the space, means at the fluid inlet and means at the fluid outlet for keeping the granules within the space while permitting fluid flow, and at least one fluid flow responsive member within the core member serving to provide a variable resistance to fluid flow in accordance with the resistance of the granules to fluid flow so that a substantially constant percentage of fluoride is present in fluid from the fluid outlet.

4. A fluoridizer for attachment to a water spout including a casing with an inside hub at one end and a turned-in portion at the other end forming a fluid inlet and a fluid outlet, respectively, a coaxial core member of smaller cross-sectional area than the cross-sectional area of the casing to provide an annulus, the core member having a flanged portion with a plurality of holes positioned adjacent the fluid outlet and permitting restricted fluid flow through the holes and the fluid outlet, a core-centering plate having its outside flanged to fit over the hub and its inside flanged to fit inside the core member, the plate being provided with holes permitting fluid flow into the annulus, a mixture of magnesium fluoride granules and calcium fluoride granules contained in the annulus and having from 25% to 90% by weight of magnesium fluoride, a fine-mesh screen disposed inside the hub and against the plate to prevent the granules from escaping through the holes in the plate, a fine-mesh screen and a coarser-mesh screen inserted between the core member flange and the turned-in portion of the casing, the fine-mesh screen serving to prevent the granules from escaping and the coarser-mesh screen serving to protect the fine-mesh screen from damage, and a plurality of solid spherical members disposed within the core member and serving to provide a variable resistance to fluid flow in accordance with the resistance of the granules to fluid flow so that a substantially constant percentage of fluoride is present in fluid from the fluid outlet.

References Cited in the file of this patent

UNITED STATES PATENTS

| 1,251,071 | McKinney | Dec. 25, 1917 |
| 1,783,163 | Griswold | Nov. 25, 1930 |
| 2,749,222 | Munroe | June 5, 1956 |

FOREIGN PATENTS

| 268,440 | Great Britain | Apr. 1, 1927 |